United States Patent [19]

Kunz et al.

[11] Patent Number: 4,667,793
[45] Date of Patent: May 26, 1987

[54] FRICTION CLUTCH AND DIAPHRAGM SPRING THEREFOR

[75] Inventors: Martin Kunz, Bühl/Eisental; Dieter Pretzel, Baden-Baden, both of Fed. Rep. of Germany

[73] Assignee: Luk Lamellen und Kupplungsbau GmbH, Bühl/Baden, Fed. Rep. of Germany

[21] Appl. No.: 829,294

[22] Filed: Feb. 13, 1986

[30] Foreign Application Priority Data

Aug. 13, 1985 [DE] Fed. Rep. of Germany .......... 5 MR II/83-BH
Jan. 30, 1986 [DE] Fed. Rep. of Germany ....... 3602716

[51] Int. Cl.⁴ ............................................. F16D 13/72
[52] U.S. Cl. ................................ 192/70.12; 192/89 B; 267/161
[58] Field of Search ............. 192/113 A, 113 R, 89 B, 192/70.12, 70.27, 70.28; 188/71.6, 264 R, 264 A; 267/161, 167

[56] References Cited

U.S. PATENT DOCUMENTS

| 2,171,829 | 9/1939 | Haupt | 192/113 A X |
| 3,417,846 | 12/1968 | Cook | 192/89 B |
| 4,241,819 | 12/1980 | Babcock et al. | 192/70.27 |
| 4,300,669 | 11/1981 | Browne | 192/109 A |

FOREIGN PATENT DOCUMENTS 6606711 11/1970 Fed. Rep. of Germany .

Primary Examiner—George H. Krizmanich
Attorney, Agent, or Firm—Peter K. Kontler

[57] ABSTRACT

A friction clutch wherein the prongs of the diaphragm spring are formed with half spoon-shaped vanes each of which is adjacent to one edge face of the respective prong and serves to circulate air when the spring rotates. Each prong is further formed with a reinforcing rib which extends radially outwardly from the respective vane and into the ring-shaped main section of the spring. The ribs stiffen the prongs and prevent them from bending during actuation of the clutch, namely while the tips of the prongs are pushed or pulled in a direction to relax the bias of the spring upon the pressure plate of the clutch.

18 Claims, 2 Drawing Figures

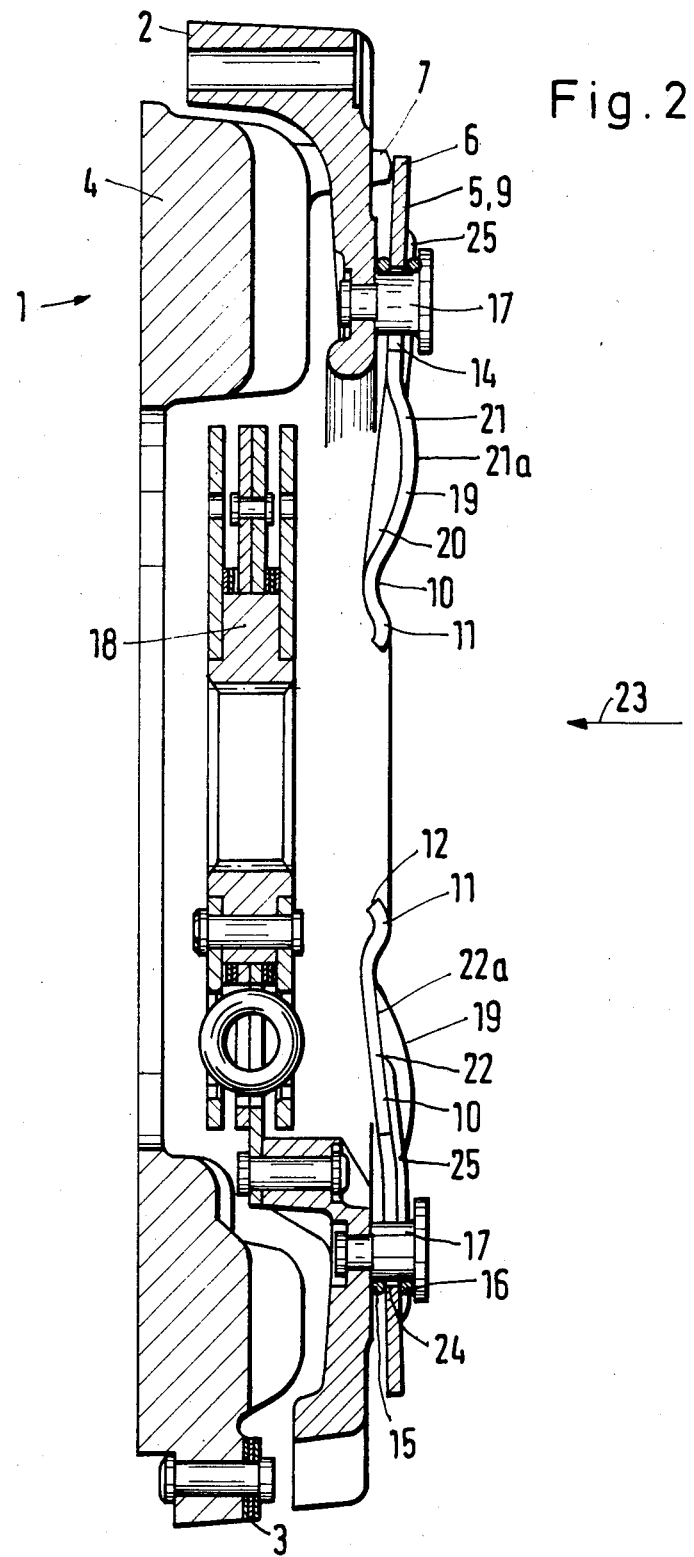

FRICTION CLUTCH AND DIAPHRAGM SPRING THEREFOR

CROSS-REFERENCE TO RELATED CASE

The friction clutch of the present invention constitutes an improvement over and a further development of the friction clutch which is disclosed in the commonly owned copending patent application Ser. No. 465,783 filed Feb. 11, 1983 by Phong Lu for "Friction clutch and diaphragm spring therefor" and in the commonly owned copending patent application Ser. No. 531,930 filed Sept. 13, 1983 by Wolfgang Reik for "Friction clutch and diaphragm spring therefore".

BACKGROUND OF THE INVENTION

The present invention relates to friction clutches in general, and more particularly to improvements in diaphragm springs which are utilized in friction clutches, especially in friction clutches for transmission of torque between the engine and the change-speed transmission of a motor vehicle.

As a rule, the diaphragm spring of a friction clutch for use in motor vehicles or the like comprises a ring-shaped main section and a set of radially inwardly extending prongs or fingers which are separated from each other by slots and whose free end portions or tips define a centrally located opening. The diaphragm spring is tiltably mounted on a support, e.g., on the housing or cover of the friction clutch, and bears against a pressure plate so as to urge the latter axially toward engagement with the friction linings of a clutch disc. The pressure plate is driven by the crankshaft and the clutch disc transmits torque to the input shaft of the change-speed transmission if the friction clutch is installed in a motor vehicle.

The trend in the automobile industry is toward the making of high-performance lightweight and compact vehicles. This involves a reduction of the weight and space requirements of practically all components including the friction clutch. Thus, the working capacity of the clutch should be increased, and such increase should take place simultaneously with a reduction in dimensions and weight. Since the manufacturer of a friction clutch does not have too much freedom in the selection of materials for component parts of the friction clutch (rather narrow limits are imposed by the cost of raw materials as well as by the ability of materials to be treated in an economical way). One of the important parameters of a satisfactory friction clutch for use in motor vehicles is its ability to stand pronounced thermal stresses for extended intervals of time and/or to dissipate heat before the elevated temperatures could adversely affect sensitive friction linings and certain other heat-sensitive parts. The operating temperature of a modern compact engine for motor vehicles is sufficiently high to greatly reduce the useful life of friction linings and/or to cause undesirable and pronounced thermally induced distortion of the cover, pressure plate, clutch disc and/or other parts of the friction clutch. Therefore, rapid dissipation of friction-induced heat in a friction clutch is of utmost importance.

German Utility Model No. 66 06 711 proposes to provide the diaphragm spring of a friction clutch with openings in the region of slots between the prongs. The openings are supposed to allow for circulation of air and attendant cooling of the friction clutch. The dimensions of such openings cannot be increased at will because this would entail undue weakening of the spring. Furthermore, and in the absence of any additional undertakings, mere provision of openings in the prongs contributes little, if anything, to the dissipation of heat.

U.S. Pat. No. 3,417,846 proposes to provide bent-over portions at one or both sides of each prong of the diaphragm spring. The purpose of such configuration of the prongs is to reduce the lift-off losses which develop as a result of bending of the prongs. The bent-over portions are supposed to reinforce the prongs and to thus ensure predictable disengagement of the clutch while minimizing the distance which the prongs must cover in order to effect a disengagement of the pressure plate from the adjacent linings of the clutch disc.

OBJECTS AND SUMMARY OF THE INVENTION

An object of the invention is to provide a novel and improved friction clutch wherein the dissipation of heat is more satisfactory than in heretofore known friction clutches.

Another object of the invention is to provide a novel and improved diaphragm spring for use in a friction clutch for motor vehicles or the like.

A further object of the invention is to provide a simple, compact and inexpensive friction clutch which has a built-in automatic cooling or heat-dissipating system and which can be used as a pull-type or push-type clutch.

An additional object of the invention is to provide a diaphragm spring which is constructed and configurated in such a way that the lift-off losses are minimal as well as that the prongs of the spring automatically effect a cooling of the spring as well as of the entire clutch when the spring is set in rotary motion.

Still another object of the invention is to provide a novel and improved method of reinforcing and/otherwise improving the characteristics and adding to the utility of prongs in a diaphragm spring for use in friction clutches.

Another object of the invention is to provide a novel and improved method of enhancing the rigidity of prongs in a diaphragm spring.

A further object of the invention is to prolong the useful life of a friction clutch and its components, to shield the components of the friction clutch from overheating, and to ensure a predictable disengagement of the friction clutch.

An additional object of the invention is to provide a friction clutch wherein the diaphragm spring is constructed and mounted in such a way that it can perfrom the functions of conventional diaphragm springs plus one or more additional desirable functions, particularly ensuring adequate cooling and predictable disengagement of the clutch.

The invention is embodied in a friction clutch which comprises a rotary pressure plate, a support (e.g., a cover or housing) which is adjacent to the pressure plate; and a diaphragm spring which is mounted on the support and serves to normally bias the pressure plate axially (particularly against the linging or linings of a clutch disc). The diaphragm spring comprises a ring-shaped main section and a plurality of prongs or fingers which extend substantially radially inwardly from the main section and have free end portions or tips defining a centrally located opening. The prongs of the diaphragm spring alternate with slots which communicate with the central opening, a first side of the spring faces toward the pressure plate, a second side of the spring faces away from the pressure plate, and at least some of the prongs have vanes (preferably bounded by concave surfaces at one of their sides and by convex surfaces at their other sides) each of which extends axially of the spring from one edge face toward but short of the other edge face of the respective prong (i.e., the vanes do not extend all the way from slot to slot (as considered in the circumferential direction of the diaphragm spring).

The tips of the prongs are preferably disposed at or close to the same level, as considered in the axial direction of the diaphragm spring.

All of the vanes preferably extend axially from one and the same side of the diaphragm spring, and each prong can be provided with a discrete vane. Each such vane is or can be substantially cup-shaped, and each vane is preferably axially offset with reference to the confronting edge face of the prong which is immediately adjacent to the respective vane, i.e., which is separated from the respective vane solely by a slot. The just mentioned confronting edge faces are preferably straight or flat, i.e., a portion of one edge face of each prong can be provided on a vane and the other edge face of each prong is remote from the vane. Each vane can be provided with an arcuate marginal portion in the region of the one edge face of the corresponding prong.

In accordance with a further feature of the invention, each prong can be provided with a substantially radially extending reinforcing portion which preferably merges gradually into the vane of the respective prong. Each reinforcing portion can have a flute bounded by a convex surface at one side and a concave surface at the other side of the diaphragm spring. The reinforcing portions preferably extend radially outwardly from the vanes in the respective prongs (i.e., toward and preferably into the ring-shaped section of the diaphragm spring).

The height of the reinforcing portions, as considered in the axial direction of the diaphragm spring, is preferably less than (and can be a relatively small fraction of) the height of the vanes. The arrangement may be such that all of the reinforcing portions and all of the vanes extend from one and the same side of the diaphragm spring and that each reinforcing portion merges into or comes close to the vane in the respective prong adjacent to the other (straight) edge face of such prong.

Each prong preferably comprises a single vane and preferably also a single reinforcing portion.

If the friction clutch is a push-type clutch, the diaphragm spring engages the pressure plate radially outwardly of the ring-shaped portion.

Each vane can constitute a suitably deformed (preferably cup-shaped or half spoon-shaped) portion of the respective prong. All of the vanes can be equidistant from the central opening of the diaphragm spring, as considered in the radial direction of the spring.

The novel features which are considered as characteristic of the invention are set forth in particular in the appended claims. The improved friction clutch itself, however, both as to its construction and its mode of operation, together with additional features and advantages of its diaphragm spring, will be best understood upon perusal of the following detailed description of certain specific embodiments with reference to the accompanying drawing.

BRIEF DESCRIPTION OF THE DRAWING

FIG. 2 is a sectional view as seen in the direction of arrows from the line II—II of FIG. 1.

DESCRIPTION OF THE PREFERRED EMBODIMENTS

Figure 1:
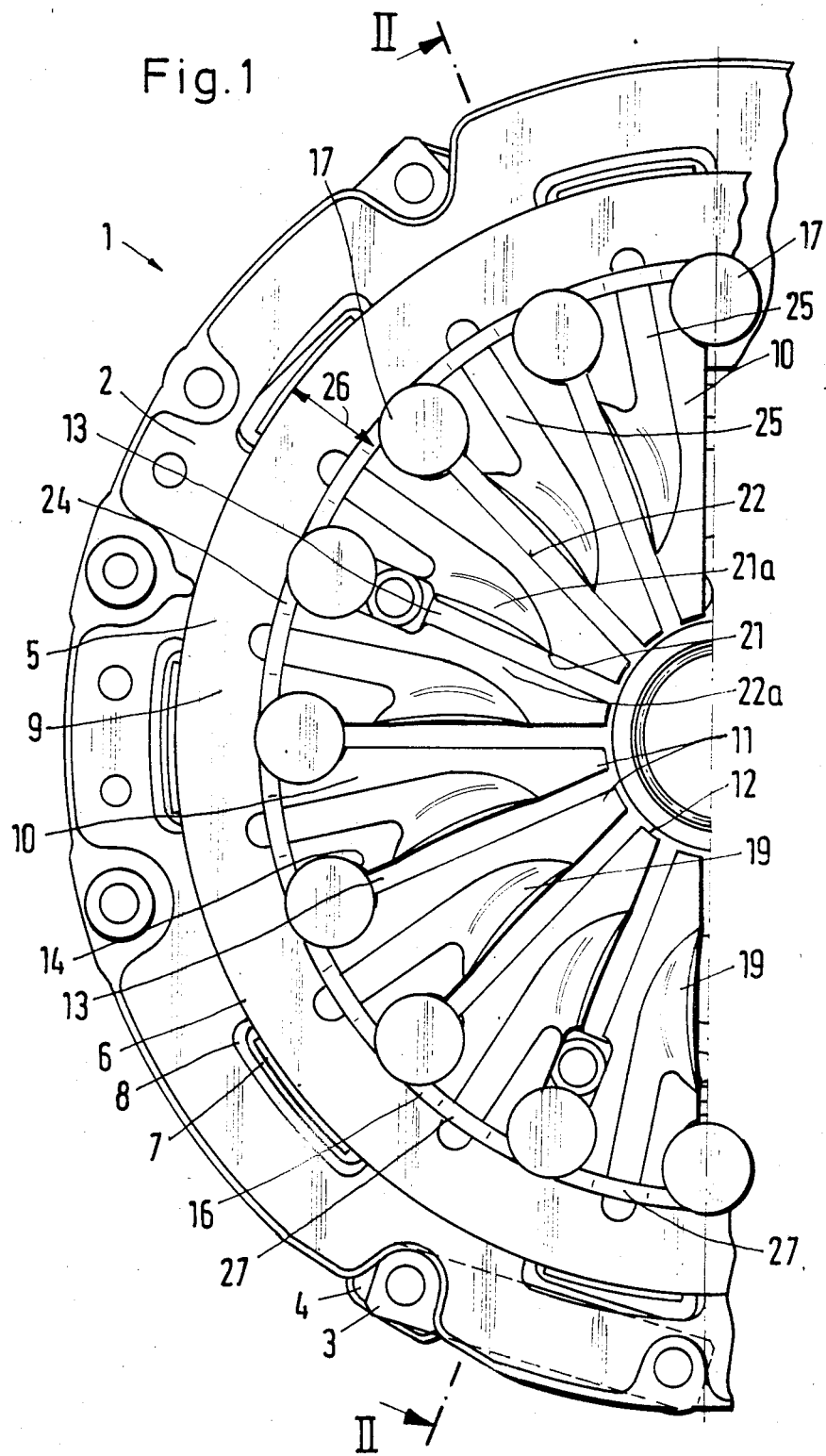
FIG. 1 is a fragmentary plan view of a friction clutch which embodies one form of the invention and wherein the tips of the prongs of the diaphragm spring must be pushed in order to disengage the clutch.

FIGS. 1 and 2 show certain details of a push-type friction clutch 1 wherein an axially movable rotary pressure plate 4 is biased axially and in a direction to the left (as viewed in FIG. 2) by the radially outermost portion 6 of a novel diaphragm spring 5. The pressure plate 4 has a set of projections 7 which are normally acted upon by the diaphragm spring 5. The latter is tiltably mounted between two ring-shaped wire-like seats 15, 16 which are secured to a rotary support 2 by a set of rivets 17. The support 2 constitutes a housing or cover and confines a coupling disc 18. The support 2 is connected with the pressure plate 4 by a set of substantially tangentially extending prestressed leaf springs 3 which bias the pressure plate in a direction to the right, as seen in FIG. 2.

The diaphragm spring 5 is mounted at that side of the support 2 which faces away from the pressure plate 4 and this spring comprises a ring-shaped main section or portion 9 and radially inwardly extending prongs 10 which alternate with radially extending slots 13. The radially innermost free end portions or tips 11 of the prongs 10 define a centrally located opening 12. The windows 8 of the support 2 allow the projections 7 on the pressure plate 4 to extend therethrough and to be engaged by the radially outermost portion 6 of the diaphragm spring 5. The tips 11 of the prongs 10 are disposed at or close to the same level, as considered in the axial direction of the pressure plate 4 and diaphragm spring, and such tips are suitably curved so as to be properly engageable by a conventional push-type actuator (not shown) which serves to change the conicity of the diaphragm spring 5 so that the radially outermost portion 6 moves in a direction to the right, as viewed in FIG. 2. The radially outermost portions 14 of the slots 13 are enlarged so that they can receive the shanks of the rivets 17.

Each prong 10 is provided with a vane 19 which is substantially cup-shaped or half spoon-shaped and extends axially from that side of the diaphragm spring 5 which faces away from the pressure plate 4. The vanes 19 are disposed at the same distance from the respective tips 11 and are spaced apart from the ring-shaped section 9 of the diaphragm spring 5. The dimensions of the vanes 19 are such that each thereof extends from one edge face 21 toward but short of the other edge face 22 of the respective prong 10, as considered in the circumferential direction of the diaphragm spring 5. The configuration of each vane 19 is such that its height (measured axially of the spring 5) is greatest in the region of the respective portion 21a of the edge face 21 and that its height diminishes gradually in a direction toward the portion 22a of the other edge face 22 of the corresponding prong 10. All of the prongs 10 are provided with vanes 19 and all of the vanes extend from the same side of the spring 5. The concave surfaces of the vanes 19 bound passages 20 for the flow of air from one side to the other side of the diaphragm spring 5 when the latter rotates with the support 2 and pressure plate 4. Each vane 19 merges gradually into the major portion of the respective prong 10 and the prong portion between the respective vane 20 and the other edge face 22 is flat. The edge faces 22 are straight or substantially straight. Otherwise stated, the edge face 22 of any one of the prongs 10 and the edge face 21 of the neighboring prong 10 (in the region of the vane 19 in the neighboring prong) are axially offset with reference to each other because the edge face 22 is straight whereas the adjacent edge face 21 of the neighboring prong 10 is curved (as at 21a) due to the formation of the vane 19 in the neighboring prong. Each vane 19 can constitute a suitably deformed integral portion of the respective prong 10. Each edge face 22 has a portion 22a which is directly adjacent to the highest portion of the vane 19 on the neighboring prong 10 (such portion 22a is separated from the adjacent curved portion 21a of the edge face 21 on the adjacent prong 10 by the corresponding slot 13).

The arrow 23 (FIG. 2) indicates the direction in which the actuator must push the tips 11 of the prongs 10 in order to disengage the friction clutch 1. The diaphragm spring 10 acts not unlike a two-armed lever which pivots between the seats 15, 16 (as at 24) to move its radially outermost portion 6 in a direction to the right (as viewed in FIG. 2) in order to allow the pressure plate 4 to rotate independently of the clutch disc. The prestressed leaf springs 3 then cause the pressure plate 4 to move counter to the direction which is indicated by the arrow 23.

In accordance with a further feature of the invention, at least some (but preferably all) of the prongs 10 are provided with reinforcing portions in the form of substantially radially extending ribs 25. Such ribs stiffen the prongs 10 and reduce the likelihood of flexing of the prongs in response to axial movement (arrow 23) of the aforementioned actuator. Thus, the prongs 10 can transmit forces to the ring-shaped main section 9 of the diaphragm spring 5 without any or with minimal flexing. As can be seen in the drawing, each reinforcing portion or rib 25 extends radially outwardly from the respective vane 19 and across the region 24 where the diaphragm spring 5 must be tilted in order to engage or disengage the friction clutch 1. The radially outermost portions of the ribs 25 extend into the ring-shaped section 9. Each rib 25 terminates short of the outer marginal portion of the diaphragm spring 5, i.e., such ribs do not extend into the radially outermost portion 6 which normally bears against the projections 7 of the pressure plate 4. The length of that portion of each rib 25 which extends into the section 9 can equal or approximate 30 percent of the width 26 of the section 9 (as measured in the radial direction of the diaphragm spring 5).

The radially innermost portions of the ribs 25 merge gradually into the respective vanes 19 in regions close to the corresponding edge faces 22. The flutes which are defined by the ribs 25 at that side of the diaphragm spring 5 which faces toward the pressure plate 4 communicate with the passages 20 of the respective vanes 19. The transition from the vane 19 into the rib 25 of each prong 10 is preferably gradual. This can be seen in FIG. 1 which further shows that the ribs 25 as well as the vanes 19 are spaced apart from the respective edge faces 22 and that the radially innermost portions of the ribs 25 merge into the shallowest portions of the respective vanes 19. Each rib 25 preferably extends substantially midway between the respective edge faces 21 and 22.

FIG. 2 shows that the height of the ribs 25 is or can be a relatively small fraction of the height of the vanes 19, as considered in the axial direction of the diaphragm spring 5 and pressure plate 4. It has been found that the prongs 10 can constitute highly satisfactory air circulating means and that they exhibit a highly satisfactory rigidity if the height of the vanes 19 is between two and four times the height of the ribs 25. The ribs 25 and the vanes 19 are preferably formed in a simultaneous operation as a result of suitable deformation of the blank which is converted into the diaphragm spring 5.

In order to ensure adequate mounting of the diaphragm spring 5 between the wire-like seats 15 and 16, the seat 16 (at that side of the diaphragm spring from which the ribs 25 and the vanes 19 extend) is provided with axially extending recesses 27 which are sufficiently deep to receive the adjacent portions of the ribs 25 without any contact between such ribs and the seat 16. In other words, the seat 16 has an undulate shape, as considered in the circumferential direction of the ring-shaped section 9, and only those portions which alternate with the recesses 27 actually contact the corresponding side of the diaphragm spring 5. Each of the recesses 27 can be bounded by an arcuate portion of the seat 16.

As mentioned above, the illustrated friction clutch 1 is a push-type clutch because the tips 11 of the prongs 10 must be pushed in order to enable the pressure plate 4 to follow the bias of the prestressed leaf springs 3. The projections 7 engage the radially outermost portion 6 of the diaphragm spring 5. The vanes 19 are disposed between the tips 11 of the respective prongs 10 and the region 24 where the diaphragm spring 5 must be tilted between the seats 15 and 16. Such positioning of the vanes 19 ensures a highly satisfactory circulation of air and adequate cooling of the diaphragm spring as well as of the friction linings and other parts of the clutch 1 when the pressure plate 4 is rotated by the output element of a prime mover, e.g., by the crankshaft of the engine in a motor vehicle.

However, the diaphragm spring 5 can be used with equal or similar advantage in so-called pull-type friction clutches wherein a first portion of the spring is in engagement with the housing or another support and a second portion (located radially inwardly of the first portion) engages the pressure plate. The vanes are then provided radially inwardly of the second portion of the diaphragm spring, i.e., between the second portion and the tips of the respective prongs. The prongs of such diaphragm spring can also be provided with radially extending reinforcing ribs. The tips of the prongs are pulled (rather than pushed) in order to disengage the second portion of the diaphragm spring from the pressure plate (i.e., to relax the axial stress upon the pressure plate to an extent which is necessary to enable the pressure plate to move away from the adjacent friction lining or linings).

An important advantage of the improved friction clutch is that adequate cooling of all of its parts can be achieved in a simple and inexpensive way, i.e., merely by adequately shaping the prongs 10 in a conventional stamping, upsetting, bending or like machine. When the friction clutch is in use, the diaphragm spring 5 rotates in a counterclockwise direction, as viewed in FIG. 1, so that the open sides or mouths of the vanes 19 are located ahead of the edge faces 22 of the respective prongs 10.

Another important advantage of the improved friction clutch is that the reinforcing ribs 25 can be formed simultaneously with the vanes 19 and can be readily dimensioned and configurated in such a way that they reduce the lift-off losses to an acceptable level. Moreover, the ribs 25 prolong the useful life of the diaphragm spring 5 and hence of the entire friction clutch. The operation of the clutch is reliable, even after a long period of frequent use, because the rigidity of the prongs 10 remains unchanged.

It is often sufficient to provide a vane 19 and/or a rib 25 on each second or third prong 10 or even on a lesser number of prongs. However, it is presently preferred to provide each prong 10 with a single vane 19 and with a single reinforcing rib 25. The configuration of all ribs 25 and/or all vanes 19 is preferably (but need not always be) the same.

The mouths of the passages 20 for the flow of air currents from one side to the other side of the diaphragm spring 5 are preferably wide so as to allow large quantities of air to circulate in and to thoroughly cool the friction clutch. As mentioned above, this can be readily achieved by providing the mouths of the passages 20 in the regions of the respective edge faces 21 and by making the edge faces 22 (or at least the portions 22a of the edge faces 22) straight so that the difference between the level of an edge face portion 22a (as measured axially of the diaphragm spring 5) and the highest point of the adjacent arcuate edge face portion 21a is quite pronounced.

The ribs 25 are optional but they constitute a desirable and advantageous feature of the diaphragm spring. The reason that the ribs are optional is that, in certain instances, the stiffening action of the vanes 19 suffices to ensure a requisite reduction of lift-off losses. The feature that the ribs 25 merge into the vanes 19 of the respective prongs 10 is desirable and advantageous because this has been found to even further enhance the stiffening of the prongs as well as the cooling action of the currents of air which enter the mouths of the passages 20 when the diaphragm spring 5 is driven.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A friction clutch comprising a rotary pressure plate; a support adjacent to said pressure plate; and a diaphragm spring mounted on said support and arranged to bias the pressure plate axially, said diaphragm spring comprising a ring-shaped main section and a plurality of prongs extending substantally radially inwardly of said main section and having free end portions defining a centrally located opening, said spring further having slots alternating with said prongs and communicating with said opening and said prongs having first and second edge faces adjacent to the respective slots, said spring further having a first side facing toward and a second side away from said pressure plate, at least some of said prongs having substantially radially extending reinforcing portions and vanes each of which extends axially of the spring from one edge face toward but short of the other edge face of the respective prong, each of said vanes being provided at one side of the respective prong.

2. The friction clutch of claim 1, wherein all of said free end portions are disposed substantially at the same level, as considered in the axial direction of the diaphragm spring.

3. The friction clutch of claim 1, wherein each of said prongs has a vane.

4. The friction clutch of claim 1, wherein each of said vanes is cup-shaped.

5. The friction clutch of claim 1, wherein each of said vanes is axially offset with reference to the confronting edge face of the prong which is adjacent to the respective vane.

6. The friction clutch of claim 5, wherein said confronting edge faces are substantially straight.

7. The friction clutch of claim 5, wherein each of said vanes has an arcuate marginal portion in the region of the one edge face of the respective prong.

8. The friction clutch of claim 1, wherein said reinforcing portions extend radially outwardly from the vanes of the respective prongs.

9. The friction clutch of claim 8, wherein at least some of said reinforcing portions extend into said ring-shaped section.

10. The friction clutch of claim 1, wherein said reinforcing portions extend axially of said spring and the height of such reinforcing portions, as considered in the axial direction of said spring, is less than the height of said vanes.

11. The friction clutch of claim 1, wherein said reinforcing portions extend axially and beyond one and the same side of said spring.

12. The friction clutch of claim 1, wherein each of said prongs has a single vane.

13. The friction clutch of claim 1, wherein said spring engages the pressure plate radially outwardly of said ring-shaped section.

14. The friction clutch of claim 1, wherein each of said vanes constitutes a deformed portion of the respective prong.

15. The friction clutch of claim 1, wherein all of said vanes are disposed at the same distance from the free end portions of the respective prongs, as considered in the radial direction of said spring.

16. A friction clutch comprising a rotary pressure plate; a support adjacent to said pressure plate; and a diaphragm spring mounted on said support and arranged to bias the pressure plate axially, said diaphragm spring comprising a ring-shaped main section and a plurality of prongs extending substantially radially inwardly of said main section and having free end portions defining a centrally located opening, said spring further having slots alternating with said prongs and communicating with said opening and said prongs having first and second edge faces adjacent to the respective slots, said spring further having a first side facing toward and a second side facing away from said pressure plate, at least some of said prongs having substantially radially extending reinforcing portions and vanes each of which extends axially of the spring from one edge face toward but short of the other edge face of the respective prong, each of said vanes merging into the reinforcing portion of the respective prong.

17. A friction clutch comprising a rotary pressure plate; a support adjacent to said pressure plate; and a diaphragm spring mounted on said support and arranged to bias the pressure plate axially, said diaphragm spring comprising a ring-shaped main section and a plurality of prongs extending substantially radially inwardly of said main section and having free end portion defining a centrally located opening, said spring further having slots alternating with said prongs and communicating with said opening and said prongs having first and second edge faces adjacent to the respective slots, said spring further having a first side facing toward and a second side facing away from said pressure plate, at least some of said prongs having substantially radially extending reinforcing portions and vanes each of which extends axially of the spring from one edge face toward but short of the other edge face of the respective prong, at least some of said reinforcing portions merging gradually into the vanes of the respective prongs.

18. A friction clutch comprising a rotary pressure plate; a support adjacent to said pressure plate; and a diaphragm spring mounted on said support and arranged to bias the pressure plate axially, said diaphragm spring comprising a ring-shaped main section and a plurality of prongs extending substantially radially inwardly of said main section and having free end portions defining a centrally located opening, said spring further having slots alternating with said prongs and communicating with said opening and said prongs having first and second edge faces adjacent to the respective slots, said spring further having a first side facing toward and a second side facing away from said pressure plate, at least some of said prongs having substantially radially extending reinforcing portions and vanes each of which extends axially of the spring from one edge face toward but short of the other edge face of the respective prong, said reinforcing portions merging into the vanes of the respective prongs in the regions of the other edge faces of such prongs.

* * * * *